United States Patent
Lallement et al.

(10) Patent No.: US 10,642,950 B2
(45) Date of Patent: May 5, 2020

(54) VERIFYING PLANARIZATION PERFORMANCE USING ELECTRICAL MEASURES

(71) Applicant: International Business Machines Corporation, Armonk, NY (US)

(72) Inventors: Romain Lallement, Troy, NY (US); Stuart A. Sieg, Albany, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 116 days.

(21) Appl. No.: 15/889,415

(22) Filed: Feb. 6, 2018

(65) Prior Publication Data
US 2019/0243927 A1 Aug. 8, 2019

(51) Int. Cl.
*G06F 17/50* (2006.01)
*G01R 31/00* (2006.01)
*H01L 21/66* (2006.01)

(52) U.S. Cl.
CPC ......... *G06F 17/5081* (2013.01); *G01R 31/00* (2013.01); *G06F 17/504* (2013.01); *G06F 17/5068* (2013.01); *G06F 2217/12* (2013.01); *H01L 22/00* (2013.01)

(58) Field of Classification Search
None
See application file for complete search history.

(56) References Cited

U.S. PATENT DOCUMENTS

| | | | |
|---|---|---|---|
| 5,067,101 A | 11/1991 | Kunikiyo et al. | |
| 6,978,229 B1 | 12/2005 | Saxena et al. | |
| 7,152,215 B2* | 12/2006 | Smith | G06F 17/5068 716/52 |
| 7,155,689 B2 | 12/2006 | Pierrat et al. | |
| 7,437,206 B2* | 10/2008 | Roover | G05B 17/02 700/121 |
| 7,814,456 B2* | 10/2010 | Gupta | G03F 1/36 716/100 |
| 8,024,675 B1 | 9/2011 | Gupta et al. | |
| 8,227,307 B2 | 7/2012 | Chen et al. | |

(Continued)

OTHER PUBLICATIONS

P. J. Wright et al., "VLSI Interconnect Linewidth Variation: A Method to Characterize Depth of Focus and Proximity Effects," Proc. IEEE 1992 Int'l Conference on Microelectronic Test Structures, vol. 5, pp. 185-189. (Year: 1992).*

(Continued)

*Primary Examiner* — Leigh M Garbowski
(74) *Attorney, Agent, or Firm* — Cantor Colburn LLP; Vazken Alexanian

(57) ABSTRACT

Embodiments of the invention include techniques for verifying planarization performance using electrical measures, the techniques include modeling, by a processor, a planarization layer for a topography of a device, and designing a chip including one or more structures. The techniques also include measuring electrical characteristics of the one or more structures, and comparing measured electrical characteristics of the one or more structures to target specifications for the one or more structures. Techniques include applying the planarization model to the one or more structures, and correlating the measured electrical characteristics to the planarization layer.

16 Claims, 8 Drawing Sheets

(56) References Cited

U.S. PATENT DOCUMENTS

| | | | |
|---|---|---|---|
| 8,359,558 B2 | 1/2013 | Tang et al. | |
| 9,026,954 B2 | 5/2015 | Perez et al. | |
| 10,303,829 B2* | 5/2019 | Bhosale | H01L 22/20 |
| 2008/0162103 A1* | 7/2008 | White | G03F 7/705 |
| | | | 703/13 |
| 2013/0241075 A1* | 9/2013 | Yeh | B24B 37/013 |
| | | | 257/774 |
| 2014/0015107 A1* | 1/2014 | Chen | B24B 37/015 |
| | | | 257/618 |
| 2016/0162626 A1* | 6/2016 | Herrmann | G06F 17/5081 |
| | | | 716/51 |
| 2018/0096905 A1* | 4/2018 | Burns | H01L 22/20 |

OTHER PUBLICATIONS

E. Chang et al., "Using a Statistical Metrology Framework to Identify Systematic and Random Sources of Die- and Wafer-level ILD Thickness Variation in CMP Process," 1995 IEEE, IEDM, pp. 499-502. (Year: 1995).*

J. Luo et al., "A Layout Dependent Full-Chip Copper Electroplating Topography Model," 2005 IEEE, pp. 133-140. (Year: 2005).*

P. Gupta et al., "Wafer topography-aware optical proximity correction for better DOF margin and CD control," Proc SPIE 5853, Photomask and Next Gneration Lithography Mask Technology XII, 2005, pp. 844-854. (Year: 2005).*

P. Gupta et al., "Wafer topography-aware Optical Proximity Correction," IEEE Trans. on Computer-Aided Design of Integrated Circuits and Systems, vol. 25, No. 12, Dec. 2006, pp. 2747-2756. (Year: 2006).*

K. Murayama et al., "Three-Dimensional Metrology for CMP process evaluation with In-line Wide-Area Atomic Force Microscope," Int'l Conference on Planarization/CMP Technology, 2007, 6 pages. (Year: 2007).*

L. Ravel et al., "Anticipated of dimensional issues caused by topography during photo lithography," Proc. of SPIE 8166, Photomask Technology 2011, 11 pages. (Year: 2011).*

R. K. Kuncha et al., "OPC verification considering CMP induced topography," Proc of SPIE 9661, 31st European Mask and Lithography Conference, 2015, 8 pages. (Year: 2015).*

J.-G. Simiz et al., "Predictability and impact of product layout induced topology on across-field focus control," Proc. of SPIE 9424, Metrology, Inspection, and Process Control for Microlithography XXIX, 13 pages. (Year: 2015).*

Asenov et al., "Intrinsic threshold voltage fluctuations in decanano MOSFETs due to local oxide thickness variations," IEEE Transactions on Electron Devices, vol. 49, No. 1, 2002, pp. 112-119.

Ravel et al., "Anticipation of dimensional issues caused by topography during photo lithography," Proc. of SPIE, vol. 8166, 2011, 81663J, 10 pages.

Azuma et al., "Methodology of MOSFET characteristics fluctuation description using BSIM3v3 spice model for statistical circuit simulations," 3rd International Workshop on Statistical Metrology, 1998, pp. 14-17.

* cited by examiner

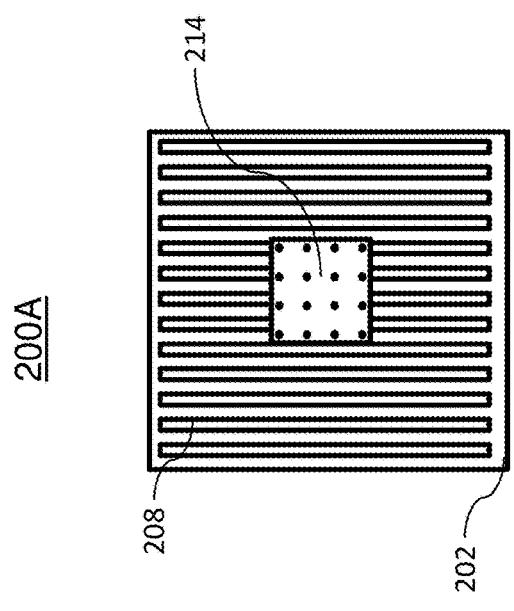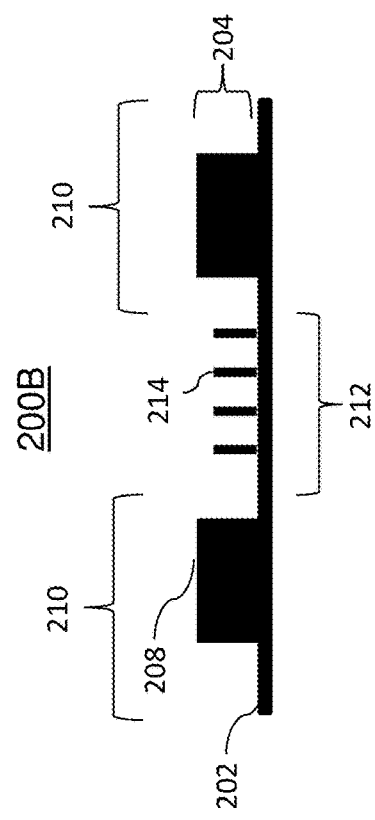
FIG. 2A
FIG. 2B

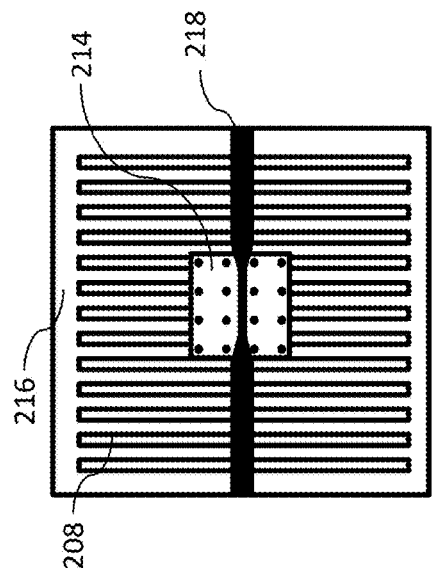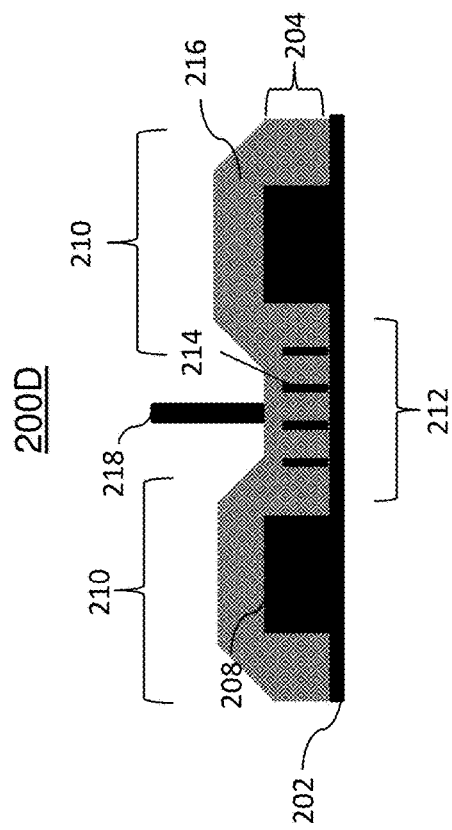

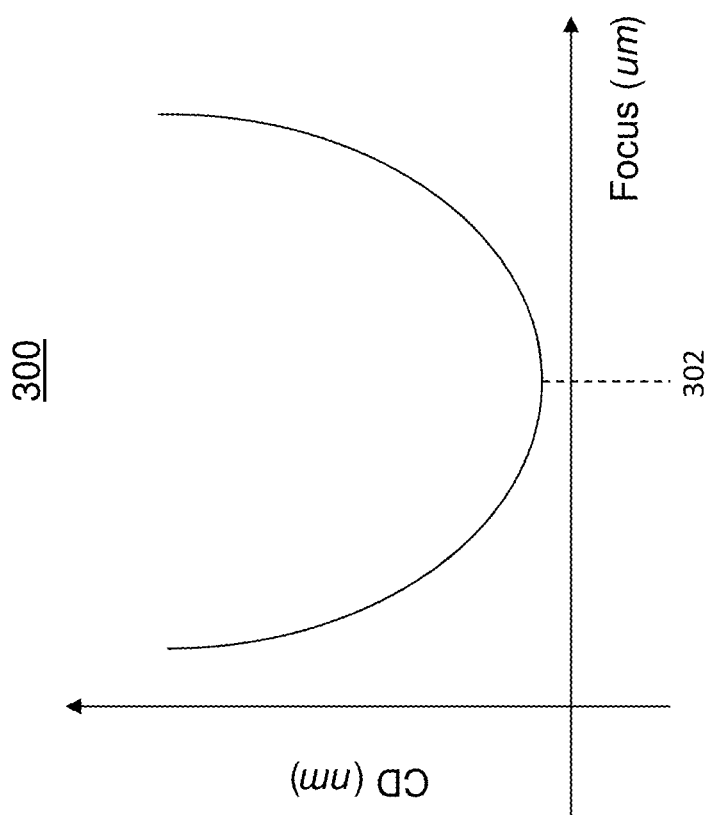

VERIFYING PLANARIZATION PERFORMANCE USING ELECTRICAL MEASURES

BACKGROUND

The present invention generally relates to semiconductors, and more specifically, to using electrical measures to verify the planarization performance of a semiconductor device.

Field effect transistors (FETs) have been known for a number of years and are now the transistor of choice for use in complex integrated digital circuits. In general, field effect transistors can be fabricated somewhat more simply and with larger process windows than bipolar transistors and, additionally, allow simplified circuit and device design. Constraints on transistor footprint size and current-carrying capacity are continually increasing to satisfy demands for higher digital switching performance, increased functionality and economy of manufacture.

SUMMARY

Embodiments of the present invention are directed to a computer-implemented method for verifying planarization performance using electrical measures. A non-limiting example of the computer-implemented method includes modeling, using a processor, a planarization layer for a topography of a device, and designing a chip including one or more structures. The computer-implemented method also includes collecting measured electrical characteristics of the one or more structures, and comparing measured electrical characteristics of the one or more structures to target specifications for the one or more structures. The computer-implemented method includes applying the planarization model to the one or more structures, and correlating the measured electrical characteristics to the planarization layer.

Embodiments of the present invention are directed to a system for verifying planarization performance using electrical measures. A non-limiting example of the system includes a memory and processor configured to model a planarization layer for a topography of a device, and design a chip including one or more structures. The processor is further configured to collect measured electrical characteristics of the one or more structures, and compare measured electrical characteristics of the one or more structures to target specifications for the one or more structures. The processor is also configured to apply the planarization model to the one or more structures, and correlate the measured electrical characteristics to the planarization layer.

Embodiments of the invention are directed to a computer program product for verifying planarization performance using electrical measures, the computer program product including a computer readable storage medium having program instructions embodied therewith. The program instructions are executable by a processor to cause the processor to perform a method. A non-limiting example of the method includes modeling a planarization layer for a topography of a device, and designing a chip including one or more structures. The method also includes collecting measured electrical characteristics of the one or more structures, and comparing measured electrical characteristics of the one or more structures to target specifications for the one or more structures. The method includes applying the planarization model to the one or more structures, and correlating the measured electrical characteristics to the planarization layer.

Additional technical structures and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other structures and advantages of the embodiments of the invention are apparent from the following detailed description taken in conjunction with the accompanying drawings in which:

FIG. 2A depicts a top-down view of a topography in accordance with one or more embodiments of the invention;

FIG. 2B depicts a cross-sectional view of a topography in accordance with one or more embodiments of the invention;

FIG. 2C depicts a top-down view of a topography and planarization layer in accordance with one or more embodiments of the invention;

FIG. 2D depicts a cross-sectional view of a topography and planarization layer in accordance with one or more embodiments of the invention;

FIG. 3 depicts a reference curve for verifying planarization performance using electrical measurements in accordance with one or more embodiments of the invention;

Figure 1:
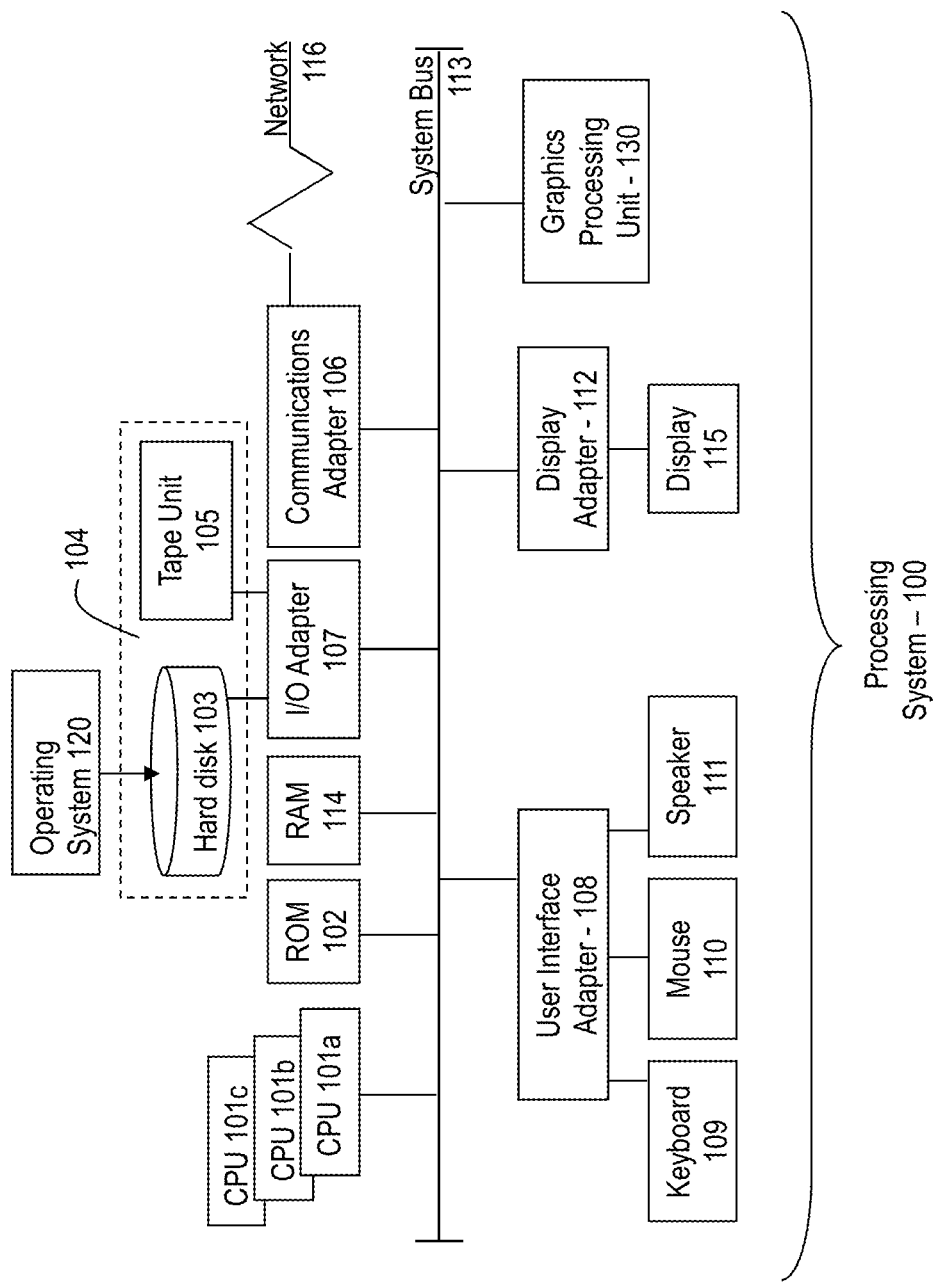
FIG. 1 depicts a system in accordance with one or more embodiments of the invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the described embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" can be understood to include any integer number greater than or equal to one, i.e. one, two, three, four, etc. The terms "a plurality" can be understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, in recent years, there has been significant research and development with regard to nonplanar transistor architectures. Some non-planar transistor architectures, such as VFETs, employ semiconductor fins and side-gates that can be contacted outside the active region, resulting in increased device density and some increased performance over lateral devices. In VFETs the source to drain current flows in a direction that is perpendicular to a major surface of the substrate. For example, in a known VFET configuration a major substrate surface is horizontal and a vertical fin or nanowire extends upward from the substrate surface. The fin or nanowire forms the channel region of the transistor. A source region and a drain region are situated in electrical contact with the top and bottom ends of the channel region, while the gate is disposed on one or more of the fin or nanowire sidewalls.

The fabrication techniques for the above referenced devices include a variety of steps that must be tightly controlled to obtain an optimally functioning device. These process steps include depositions, removal, patterning and doping of a combination of layers. In today's environment, as the semiconductor devices are getting smaller and more advanced, the depth-of-focus is becoming extremely small. In semiconductor lithography process, the control of patterning accurately on the different layers becomes critical. Current processes use coatings such as organic planarizing layer (OPL) to ensure the surface of the layer being printed on is flat where the flat surface increase the predictably of the performance of the structures being developed on the surface.

During the process of semiconductor fabrication various layers are grown, masked and etched. The various semiconductor devices include, but are not limited to, nanosheets, VFETs, finFETs, and the like. After topography is formed on the wafer, a spin-coat is added to smooth the surface above the topography so that other structures can be printed above the topography. One example, of the spin-coated layer is an organic planarization layer (OPL). The planarization layer allows for the printing of structures on a predictably flat surface. However, the spin-coat is non-conformal over the various densities of the underlying topography which can impact the structures that are printed on the planarization layer.

Currently, there are no known techniques to systematically measure planarization characteristics of a wafer. As devices become smaller and smaller, planarization layers such as OPL can be used to smooth the surface of the topography on which structures will be printed. The planarization characteristics can impact the structures and designs that are printed on top of the planarization layer. Therefore, it is critical the planarization characteristics be determined to modify the processing and fabrication of the semiconductor device to address any defects.

As technology advances and the devices continue to get smaller, the inconsistencies in the planarization layer can lead to undesirable consequences such as variable gate lengths and metal heights in the structures of the device. The planarization layer can be affected by the topography height, OPL/materials thickness, OPL/material composition, topography profile, etc. For example, the different topography densities result in a non-planar OPL top surface topology, which can impact gate length (Lg). Also, the variability of the planarization layer's behavior over the topography can impact the electrical parameters of the device such as the threshold voltage (Vt). These inconsistent physical characteristics can lead to inconsistent device spacing, which results in different OPL densities on substrate.

In today's environment, the planarization characteristics are determined by manually cleaving the structure and performing the measurements on the planarization layer. This technique is very labor intensive and time consuming. The designs of each topography can be measured using a scanning electron beam microscope (SEM) to determine the planarization behavior.

The techniques described herein provide a method for modeling the planarization characteristics of a device without having to manually measure each and every structure, layer, and topography of the device. After the models are obtained the models are verified, by a technique described herein, to ensure accurate data is extracted during the analysis using the model of a planarization layer. The variability in the planarization layer can detrimentally change the performance of the overall device.

Turning now to an overview of the aspects of the invention, one or more embodiments of the invention address the above-described shortcomings of the prior art by providing techniques to verify the modeling of the planarization layer is accurate. After the planarization model is determined, structures of a design will be analyzed against the model. Then, the electrical parameters of the structures are tested to determine whether the structures are performing in accordance with the target specifications. The measured electrical parameters can be used to validate the structures were printed in accordance with the design and the planarization layer is behaving as expected. After the extracting the data based on the accuracy of the model and the testing of the device, the data can be used to modify a process of fabrication to ensure the devices are performing to the targeted specifications as designed. The above-described aspects of the invention address the shortcomings of the prior art by providing a technique to validate planarization models.

Referring to FIG. 1, there is shown an example of a processing system 100 configured to implement aspects of the present invention. The system 100 includes one or more central processing units (processors) 101a, 101b, 101c, etc. (collectively or generically referred to as processor(s) 101). In embodiments of the invention, each processor 101 can include a reduced instruction set computer (RISC) microprocessor. Processors 101 are coupled to system memory 114 and various other components via a system bus 113. Read only memory (ROM) 102 is coupled to the system bus 113 and can include a basic input/output system (BIOS), which controls certain basic functions of system 100.

FIG. 1 further depicts an input/output (I/O) adapter 107 and a network adapter 106 coupled to the system bus 113. I/O adapter 107 can be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 can be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which can include a graphics adapter to improve the performance of graphics intensive applications and a video controller. In one embodiment of the invention, adapters 107, 106, and 112 can be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which can include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment of the invention, a portion of system memory 114 and mass storage 104 collectively store an operating system to coordinate the functions of the various components shown in FIG. 1. One or more of the components/modules of FIG. 1 can be implemented in the system 200 described below.

FIG. 2A provides a device having a topography formed on a wafer in accordance with one or more embodiments of the invention. Integrated circuits include multiple layers that are developed through a process of semiconductor fabrication. These layers can include the wafer 202, topography 204, planarization layer 206, printed layers and the like. It is clear that the inner layer 212 and outer region 210 are not limited to holes and/or lines, respectively. It is to be understood the devices can include other layers or a different arrangement of layers.

FIG. 2A includes a top-down view 200A and a cross-sectional view 200B of the device. The top-down view of FIG. 2A shows the topography 204 having a plurality of lines 208 formed in the outer region 210. The inner layer 212 includes a plurality of holes 214 which form the topography 204 upon which a coating forming a planarization layer 216 OPL (shown in FIG. 2B) is spun.

During process integration, the topography 204 is formed on a wafer 202. Subsequently, a coating is spun over the topography 204. The flatness of the resulting planarization layer 216 is dependent upon the underlying topography 204. For example, the density of the underlying topography 204 affects the planarization layer 216.

The cross-sectional view of FIG. 200B illustrates the difference in the shapes and heights of the topography 204 in the outer region 210 and the inner region 212. The effects of the density of the topography 204 on the planarization layer are shown in FIG. 2C and FIG. 2D.

Now referring to FIG. 2C and FIG. 2D, a top-down view 200C and a cross-sectional view 200D of the device of FIG. 2A is shown. The top down view 200C illustrates where the planarization layer 216 has been spun on the wafer 202 and a structure 218 (i.e. line) has been printed on top of the planarization layer 216. In one or more embodiments of the invention, the planarization layer 216 is an organic planarization layer (OPL). The planarization layer 216 is spun on to the wafer 202 and its topography 204 to form an even surface to print structures on during processing. As shown in FIG. 2C, the line (structure) 218 is printed across the surface of the planarization layer 216 where the printed line 218 appears wider at the outer layer 210 and thinner in the inner layer 212. This variation in the printed structure is caused by the unevenness of the spin-on coat during the process.

The density of the topography 204 impacts the smoothness of the planarization layer 216 which in turn affects the focal plane on which the structures are printed on top of the planarization layer 216. The topography 204 in the outer region 210 is more dense than the topography in the inner region 212. Due to the variation in density of the topography 204, the dip in the inner region 212 of the planarization layer 218 causes the thinning of the printed line 218. Due to this effect, the critical dimension (CD) for the printed line 218 is different in the outer layer than the inner layer which can lead to unwanted performance of the completed device.

Now referring to FIG. 2D, the cross-sectional view 200D shows the height of the planarization layer 216 of the outer layer 210 is larger than that of the inner layer 212 where the structure 218 has been printed. In the event the structure 218 had been printed on the outer layer, a different CD would result from the expected/designed target, where the CD directly affects the key parameters of the final device such as the gate length, threshold voltage, etc. In order to decrease the effects of uneven planarization layer 216, a model is built and applied to each structure 218 of a design.

Now referring to FIG. 3, a curve 300 for modeling a planarization layer in accordance with one or more embodiments is shown. The curve 300 is a Bossung curve, which shows the CD variation in relation to the focal plane variation. The minima of the curve 300 identifies the point at which the CD for a given structure is the most stable. In other words, at this point a small variation in the focus leads to a slight variation of the CD for a given structure. In one or more embodiments, a CD-SEM is used to perform measurements on the wafer. The CD-SEM offers high accuracy and repeatability when operated to perform measurements. In one or more embodiments, the curve 300 is determined for a flat planarization surface having a known underlying topography. In one or more embodiments of the invention, the CD-SEM can transmit the data to a system such as the computing system 100 shown in FIG. 1 for processing.

The x-axis of the curve 300 is the focus indicating the focal plane at which the structure is measured, where the unit of measurement is the micron. The y-axis of the curve 300 represents the CD of the reference structure 218 being measured, where the unit of measurement is nanometers (nm). The curve 300 serves as a reference curve for a given structure having a known CD where the focus is varied during the measurement to determine the corresponding variation in the CD. The structures 218 can include lines, gate, etc. The curve 300 has an extrema (minima) 302 which indicates the range of focus where the CD is the most stable. The outer edges of the curve 300 exhibit a large variation in CD with a small variation in focus. When printing structures 218 on the planarization layer 216, it is optimal to print the structures 218 at a focus closest to the minima of the curve 300. In order to determine the reference curve 300, ten CD measurements are taken for a given structure through a range of focal planes. It is to be understood that any number of measurements can be taken to determine the reference curve 300.

In one or more embodiments, prior to using the reference curve 300 during the modeling step, the device such as device 200B can be cleaved and manually measured to validate the measurements of the curve 300 increasing the reliability of the curve 300. A curve 300 that has been validated can serve as an anchor curve for subsequent analysis of planarization layers.

An uneven OPL can impact the CD for a given structure. For instance, the topography under the OPL directly affects the flatness/evenness of the OPL. In one or more scenarios, a structure being printed on an OPL layer is designed to have specific characteristics such as a target threshold voltage or gate length. In order to print structures on a planarization layer and achieve highly predictable performance, structures should be designed where the focus is close to the minima of the reference curve 300.

Figure 4B:
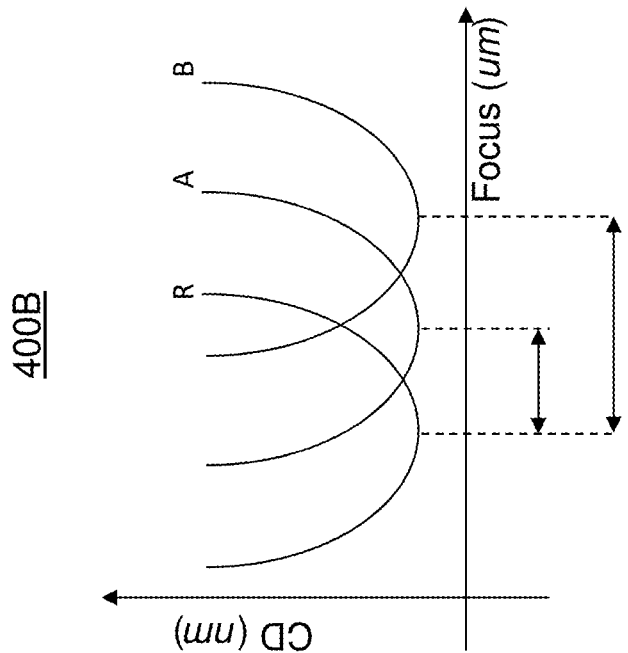
FIG. 4B depicts a different curve in accordance with one or more embodiments of the invention.
Figure 4A:
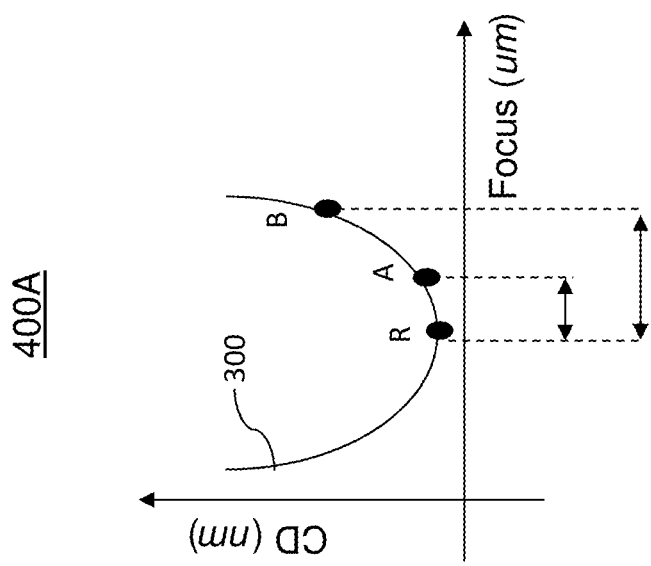
FIG. 4A depicts another curve in accordance with one or more embodiments of the invention.

Now referring to FIG. 4A, a curve 400A is shown in accordance with one or more embodiments. In a non-limiting example, the reference curve of FIG. 3 is correlated to measurements of other printed structures 218 on the planarization layer 216. In one or more embodiments, the measurements of the CD for the printed device are taken using a scanning electron-beam microscope (SEM).

After obtaining the measurement of a printed structure 218, the CD of the printed structure 218 is fit on the reference curve 300. As shown in FIG. 4A, the offset of the CD will be correlated to the focus of the reference curve 300 where the point R is the minimum of the curve 300 having the most stable CD. A first printed structure can have a CD indicated on the curve 300 as point A. A second printed structure can have a CD indicated on the curve 300 as point B. The offset in the focal planes the structures are printed on a represented by the difference between points R-A and points R-B, respectively. The information indicating the focus characterizes the planarization layer 216.

Now referring to FIG. 4B, another technique for modeling the planarization layer 216 of a device in accordance with one or more embodiments is shown. In FIG. 4B, a plurality of designs/structures are individually measured and each resulting curve is compared to a reference curve such as the curve 300 to determine the offset at which the designs/structures were printed on the device. For example, a reference curve R, a curve for a first structure A, and a curve for a second structure B is illustrated. It is to be understood that any number of topographies and curves can be analyzed in accordance with one or more embodiments.

The offset in focus for the various designs/structure can indicate information characterizing the planarization layer 216 of the device. This technique measures each structure printed on the planarization layer 216 and compares each of the measurements to the reference curve. The minima of each curve will be compared to the reference curve 300 to determine the offset of the focus to that of the reference curve 300.

The techniques described herein provide embodiments to accurately measure the planarization characteristics of a given structure without cleaving the structure that includes the OPL. Cleaving these structures is very labor intensive. The modeling technique shown in FIGS. 3, 4A and 4B provide an accurate way to determine the focal plane which corresponds to the OPL thickness. In one or more embodiments of the invention, the data is collected by automatic measurements using a critical dimension scanning electron microscope (CD-SEM). The performance of the CD-SEM is in the range of seconds per point while performing a manual cleaving process is in the range of hours per point. In order to build a model, sufficient information must be collected where using these described techniques enough information is collected to build linear models to cover the entire chip design space.

Figure 5A:
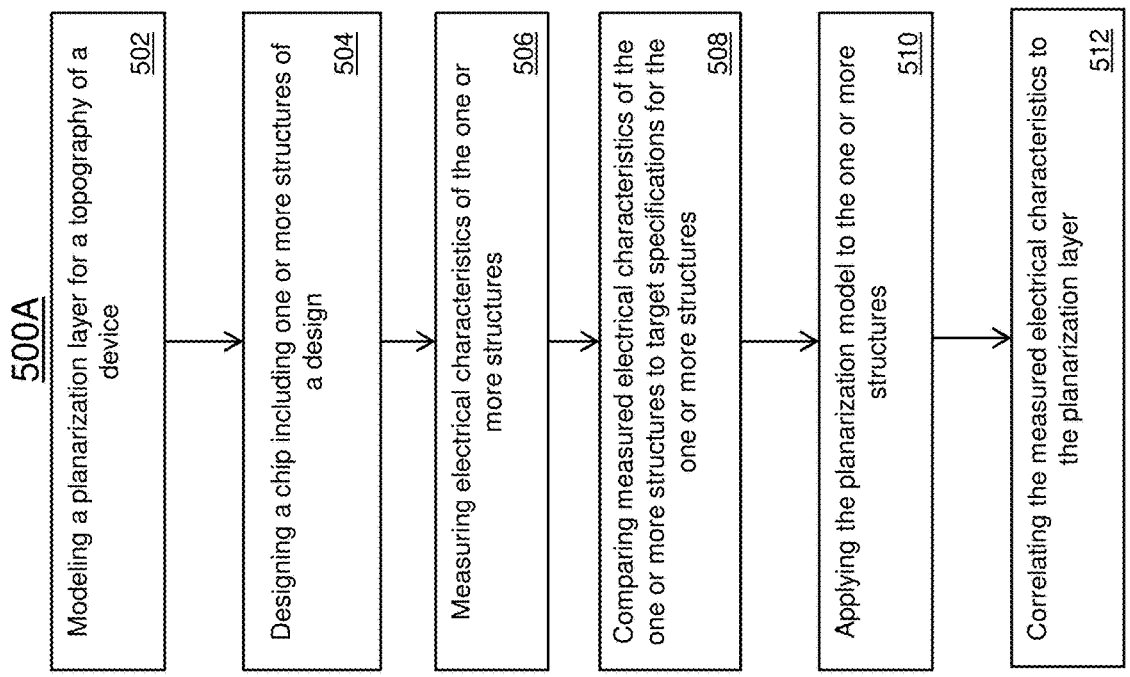
FIG. 5A depicts a flow chart for verifying planarization performance using electrical measures in accordance with one or more embodiments of the invention.

Now referring to FIG. 5A, a flow chart 500A for verifying planarization performance using electrical measures is shown. Block 502 provides modeling a planarization layer for a topography of a device. In one or more embodiments, the reference curve for a structure printed on top of the planarization layer is determined. The reference curve can be determined using the techniques described above, where a given structure CD is measured through a range of focal planes. Because a given structure having known characteristics is used, the printed layer on top of the planarization layer will be straight and measure as expected without exhibiting any thinning or other unwanted variations.

The layers of the semiconductor device include a wafer, topography, planarization layer, printed layer, etc. It is to be understood that other layers can be included in the process of developing a device.

In one or more embodiments of the invention, the planarization layer of a device is modeled by creating a Bossung curve. The focus will be varied over a number of values to determine the curve. The Bossung curve would be used as a reference curve to fit future measure on top of the topography. In one example, the focus is varied for a thousand structures and compared to the reference curve in order to determine the planarization layer characteristic/profile.

Block 504 provides designing a chip including one or more structures of a design. In one or more embodiments of the invention, structures are designed and printed on a planarization layer of a device. In some embodiments, the structures are printed on a different region of the same device used for the model. In some embodiments, the structures are printed on a different wafer all together.

Block 506 provides measuring electrical characteristics of the one or more structures. In one or more embodiments, the electrical characteristics are measured by testing each structure using known techniques. For example, the threshold voltage of each structure can be tested. In another example, the gate length can be measured. It is to be understood that other characteristics including other electrical and physical characteristics can be determined by techniques known to one having ordinary skill in the art.

In one or more embodiments, the CD for the various designs and printed structures. The measured CD can be fit on the reference curve to determine an offset in CD. The offset in CD can be related to an offset in focus. This information can be used to extract information about the planarization of the planarization layer the design or structure is printed on.

Subsequently, the planarization model is run against the design. For example, the design is either fit against the reference curve to determine the offset of the focus of each design, or a curve is determined for each design and compared to the reference curve to determine the offset of the focus.

Block 508 provides comparing the measured electrical characteristics of the one or more structures to a target specification each of the one or more structures. The electrical characteristics of each of the structures are designed to a desired specification. After printing the structures on the planarization layer, the electrical characteristics of the structures are tested and compared to the target specification. For example, the threshold voltage for the device printed on the OPL can be tested to determine at what voltage the device turns on. Any variation in the measured electrical characteristics and the target specification can be used to extract information regarding the planarization layer. In another non-limiting example, the OPL can be recessed by performing a directional etch which can be configured to set a specific height in the OPL. These characteristics can be measured and tested using one or more techniques described herein.

Block 510 provides applying the planarization model to the one or more structures. In one or more embodiments of the invention, the structures can be applied to the planarization model in a plurality of ways. One of the techniques include measuring the CD for the structures and fitting them on the reference curve developed by the model to determine the offset in the focus. The offset in the process focus can indicate a variation in the planarization layer.

In one or more embodiments of the invention, the CD for the structure can be measured through a range of focal planes resulting in a curve that can be compared to the reference curve of the planarization model. The focal plane offset between the reference curve and the current curve for the structure can be used to determine any variations of the underlying planarization layer. The extrema or the minima of each of the curves are used to compare the reference curve to curve of the structure.

The first technique includes fitting a measured CD to the reference curve while the second technique includes determining each individual curve for each of the structures and directly determining the offset among the curves.

Block 512 provides correlating the measured electrical characteristics to the planarization layer. If the measured electrical characteristics provide results that are consistent with the designed target specification, the accuracy of the planarization model is verified. However, if the results are outside of an expected window or tolerance the planarization may need to be re-built.

For instance, if the results of the electrical parameter testing are not as expected, an indication of the structure having an incorrect CD can be determined, where the error is due to the uneven planarization layer. The uneven planarization layer directly effects the printability and performance of the structures that are placed on top of the planarization layer.

On the other hand, if the electrical parameters are measured as expected, the planarization characteristics can be verified. The structures were printed as expected according to the design on top of the planarization layer.

The information extracted from correlating the electrical parameters with the planarization layer can be used to modify a process for producing the design. In this non-limiting example, the gate length and threshold voltages are used.

During a design phase of a semiconductor device, the specifications for devices and structures are selected. For example, the CD for each structure is selected and the expected performance is known such as a gate length and its corresponding threshold voltage are designed. Therefore, after the device is processed the actual parameters of the device can be tested and compared against expected design targets.

Figure 5B:
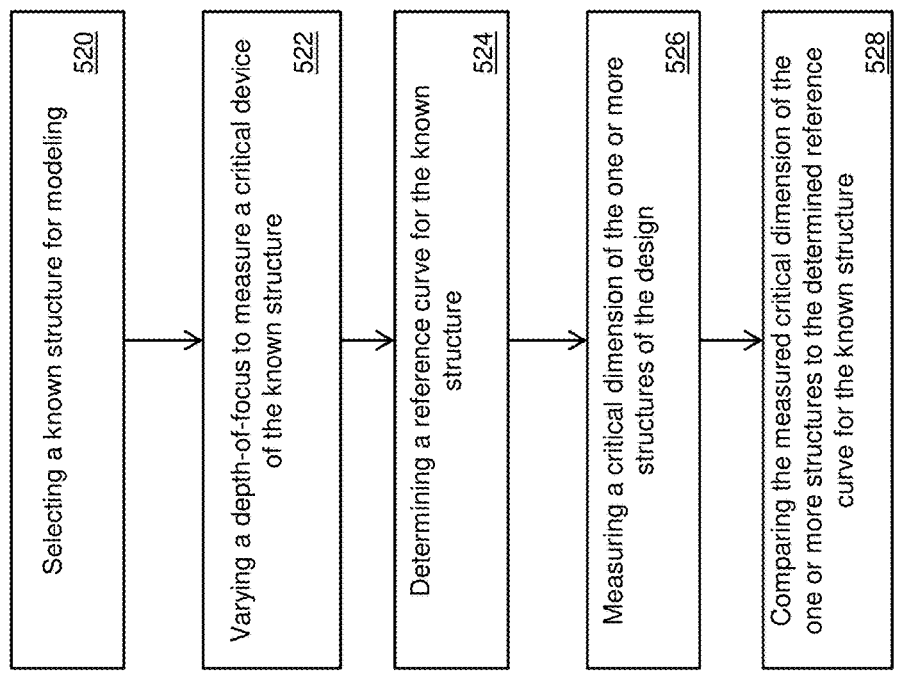
FIG. 5B depicts a flow chart for verifying planarization performance using electrical measures in accordance with one or more embodiments of the invention.

Now referring to FIG. 5B, a flow chart 500B for modeling the planarization layer in accordance with one or more embodiments of the invention is shown. Block 520 provides for selecting a known structure for modeling. In one or more embodiments of the invention, in order to determine a reference curve for comparing and modifying the process for fabricating a semiconductor device, a known structure must be modeled. The known structure includes but is not limited to a line, gate, or other structure that has known dimensions (i.e. gate length) and electrical parameters (threshold voltage). The reference curve that is developed to model the planarization layer can be used for comparing other designs and structures.

Block 522 provides for varying a depth-of focus to measure a critical device of the known structure. In one or more embodiments of the invention, a CD-SEM is used to determine the reference curve for the known structure. In one or more embodiments of the invention, the CD-SEM can transmit the extracted data to an external system for processing the data. Block 524 provides for determining a reference curve for the known structure. The reference curve provides data that correlates the change in the CD of the known structure to the variation in the focal plane. This data is used to characterize the planarization layer of the device.

Block 526 provides for measuring a critical dimension of the one or more structures of the design. In one or more embodiments of the invention the structures of a designed are analyzed using the CD-SEM.

Block 528 provides for comparing the measured critical dimension of the one or more structures to the determined reference curve for the known structures. One technique compares the measured critical dimensions of the design and fits them on the reference curve to determine the offset in the focal plane. Another technique measures the curves, for each of the structures of the design, where the critical dimension for each structure is measured through a range of focal planes, and each of the curves are compared to the reference curve to determine the offset of the focal planes at its minima. It is to be understood that other techniques can be used to determine planarization characteristics of the structures.

Figure 6:
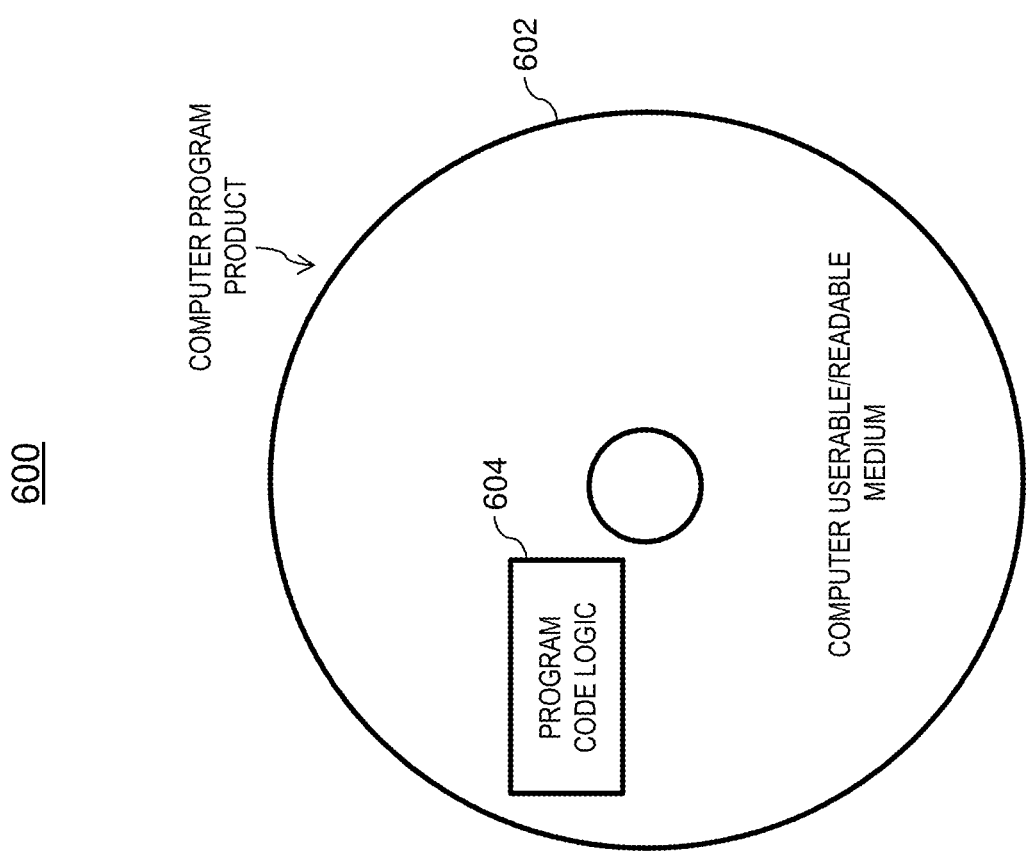
FIG. 6 depicts a diagram of a computer program product according to one or more embodiments of the invention.

Referring now to FIG. 6, a computer program product 600 in accordance with an embodiment of the invention that includes a computer readable storage medium 602 and program instructions 604 is generally shown.

The techniques implemented herein, obviate the need to cleave each and every structure of the device to obtain accurate measurements of the planarization layer. Measuring each of the structures, which can be in the thousands, is not a workable solution. Technicians no longer have to manually perform measurements which are very time consuming. The technique is provided to accurately model a spin-on coating, and verify the model using electrical measurements. The planarization layer directly impacts the electrical properties of the device.

An improvement over the prior art includes taking these measurements in sector as the devices are being manufactured and processed. Therefore, higher yield results because the devices are no longer being cleaved. The electrical output metrics are used to verify a planarization model by determining if the results are within an expected or tolerable range.

The techniques provide an automatic, in-line, non-destructive method to determine the planarization performance. Because the process is automatic means faster and avoid using human resources. In addition, the data collection is fast and more extensive compared to manual measurements. By utilizing in-line scanning electron microscope (SEM) metrology provides systematic and reliable data. Also, because these techniques are non-destructive provides for less expensive and a higher yield of devices.

The techniques described herein, validate the accuracy of planarization models and can be used to identify weak spots in the process. The feedback from the validation of the model can be used by the process team to modify the process to optimize the manufacturing of semiconductor devices. Other parameters can be highly dependent on the mapping between the electrical parameters and the model, where the extracted data can be leveraged to obtain additional information about the device.

The techniques described herein ensure the planarization models are accurate by verifying the model with electrical measurements. Using the first technique, the SEM used for measurements can have a margin of error associated with it and can lead to inaccuracies. Using the second technique, the error can be averaged over the plurality of measurements. The techniques described herein provide a semiconductor lithography process to accurately print structures on the surface of the planarization layer. Using the techniques described the semiconductor devices do not have to be cleaved and manually measured. The present invention provides a systematic, automatic, and reliable technique to measure the planarization layer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments described. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for verifying planarization performance using electrical measures, the computer-implemented method comprising:
    modeling, using a processor, a planarization layer for a topography of a device;
    designing a chip including one or more structures of a design;
    measuring electrical characteristics of the one or more structures, wherein the electrical characteristics include a threshold voltage of each of the one or more structures;
    receiving target specification for the one or more structures;
    comparing measured electrical characteristics of the one or more structures to the target specifications for the one or more structures;
    applying the planarization model to the one or more structures;
    correlating the measured electrical characteristics to the planarization model; and
    modifying a process for fabricating the chip based at least in part on a result of the correlation.

2. The computer-implemented method of claim 1, wherein the modeling includes:
    varying a depth-of-focus to measure a critical dimension of a known structure;
    determining a reference curve for the known structure;
    measuring a critical dimension of the one or more structures of the design; and
    comparing the measured critical dimension of the one or more structures to the determined reference curve for the known structure.

3. The computer-implemented method of claim 2, wherein comparing includes:
    fitting a critical dimension for each of the one or more structures on the reference curve; and
    determining a focal plane offset to the reference curve based at least in part on the critical dimension of each of the one or more structures.

4. The computer-implemented method of claim 2, wherein comparing includes:
    determining a curve for each of the one or more structures of the design; and
    comparing each curve for each of the one or more structures to the reference curve.

5. The computer-implemented method of claim 1, wherein the measuring includes measuring a gate length of each of the one or more structures.

6. The computer-implemented method of claim 1, wherein the measuring includes measuring metal height of each of the one or more structures.

7. The computer-implemented method of claim 1, wherein the planarization layer is an organic planarization layer.

8. A system for verifying planarization performance using electrical measures, the system comprising:
    storage medium, the storage medium being communicatively coupled to a processor;

the processor configured to:
- model a planarization layer for a topography of a device;
- design a chip including one or more structures;
- collect measured electrical characteristics of the one or more structures wherein the electrical characteristics include a threshold voltage of each of the one or more structures;
- compare measured electrical characteristics of the one or more structures to target specifications for the one or more structures;
- apply the planarization model to the one or more structures;
- correlate the measured electrical characteristics to the planarization layer; and
- modify a process for fabricating the chip based at least in part on a result of the correlation.

9. The system of claim 8, wherein the modeling includes varying a depth-of-focus to measure a critical dimension of a known structure;
- determining a reference curve for the known structure;
- measuring a critical dimension of the one or more structures; and
- comparing the measured critical dimension of the one or more structures of the design to the determined reference curve for the known structure.

10. The system of claim 9, wherein comparing includes fitting a critical dimension for each of the one or more structures on the reference curve; and
- determining a focal plane offset to the reference curve based at least in part on the critical dimension of each of the one or more structures.

11. The system of claim 9, wherein the comparing includes determining a curve for each of the one or more structures of the design; and
- comparing each curve for each of the one or more structures to the reference curve.

12. The system of claim 8, wherein the planarization layer is an organic planarization layer.

13. A computer program product for verifying planarization performance using electrical measurements, the computer program product comprising:

a computer readable storage medium having stored thereon program instructions executable by a processor to cause the processor to:
- model a planarization layer for a topography of a device;
- design a chip including one or more structures;
- collect measured electrical characteristics of the one or more structures wherein the electrical characteristics include a threshold voltage of each of the one or more structures;
- compare measured electrical characteristics of the one or more structures to target specifications for the one or more structures;
- apply the planarization model to the one or more structures;
- correlate the measured electrical characteristics to the planarization layer; and
- modify a process for fabricating the chip based at least in part on a result of the correlation.

14. The computer program product of claim 13, wherein the modeling includes varying a depth-of-focus to measure a critical dimension of a known structure;
- determining a reference curve for the known structure;
- measuring a critical dimension of the one or more structures of the design; and
- comparing the measured critical dimension of the one or more structures to the determined reference curve for the known structure.

15. The computer program product of claim 14, wherein comparing includes fitting a critical dimension for each of the one or more structures on the reference curve; and
- determining a focal plane offset to the reference curve based at least in part on the critical dimension of each of the one or more structures.

16. The computer program product of claim 14, wherein the comparing includes determining a curve for each of the one or more structures; and
- comparing each curve for each of the one or more structures to the reference curve.

* * * * *